United States Patent

[11] 3,616,346

[72] Inventor Kiyoshi Inoue
 100 Sakato, Kawasaki, Kanagawa, Japan
[21] Appl. No. 714,251
[22] Filed Mar. 19, 1968
[45] Patented Oct. 26, 1971
[32] Priorities Mar. 20, 1967, Mar. 28, 1967, Mar. 30, 1967, Mar. 31, 1967, Apr. 18, 1967
[33] Japan
[31] 42/17281; 42/19730; 42/20470; 42/20633; 42/24709
[22] Filed Mar. 19, 1968
[45] Patented Oct. 26, 1971
 Continuation-in-part of application Ser. No. 475,375, July 28, 1965.

[54] ION-CONTROL METHOD FOR ELECTROCHEMICAL MACHINING
 12 Claims, 21 Drawing Figs.
[52] U.S. Cl. .................................................... 204/143 M, 204/228
[51] Int. Cl. .................................................... B23p 1/00
[50] Field of Search .................................................... 204/143 M, 141, 224, 228 A, 45.9, 217, 228

[56] References Cited
 UNITED STATES PATENTS
 3,475,312 10/1969 Inoue ............................ 204/217
 3,420,759 1/1969 Inoue ............................ 204/143
 3,407,125 10/1968 Fehlner ........................ 204/228
 3,294,666 12/1966 Wiersma ...................... 204/141
 3,223,603 12/1965 Inoue ............................ 204/228
 FOREIGN PATENTS
 1,093,114 11/1967 Great Britain ............... 204/143

Primary Examiner—John H. Mack
Assistant Examiner—Sidney S. Kanter
Attorney—Karl F. Ross

ABSTRACT: Method of and apparatus for electrochemically machining a workpiece wherein the machining electrolyzing current passes in the form of steep-wavefront pulses on one polarity spaced by intervals and during these intervals, opposite-polarity pulses are applied across the tool electrode and the workpiece with a pulse width at most equal to the duration of the respective interval but preferably of a shorter duration and with an adjustable lag.

PATENTED OCT 26 1971

INVENTOR
KIYOSHI INOUE
BY
Karl J. Ross
ATTORNEY

INVENTOR
KIYOSHI INOUE
BY
Karl J. Ross
ATTORNEY

ION-CONTROL METHOD FOR ELECTROCHEMICAL MACHINING

This application is a continuation-in-part of application Ser. No. 475,375, filed July 28, 1965.

My present invention relates to an ion-control system for electrochemically machining a conductive workpiece and represents a further development of the technique originally described in my U.S. Pat. No. 3,357.912.

In the patent, I have described an apparatus for machining a conductive workpiece as well as a method making use of such apparatus wherein the current applied to the machining gap is periodically reversed for depolarization and depassivation of the surfaces of the system. As observed in that patent, one of the problems arising in electrochemical machining systems is that ion contamination occurs along the surface of the tool juxtaposed with the workpiece and/or the formation of an oxide film along the workpiece. As a consequence, a process termed "passivation" occurs in the electrode gap which must be countered by various means. In my copending application, Ser. No. 475,375, filed 28 July 1965 for example, I have described one method of eliminating such passivation whereby spark discharge breaks up a passivating film in a cavity-sinking arrangement, the passivation film being purposely generated to protect portions of the workpiece at which no machining is to occur. In this case, the depassivation or activation of the juxtaposed surfaces of the tool and workpiece makes use of high-energy mechanical electrical shock waves to destroy the film. Others have pointed out that passivation may be avoided or eliminated by using high-pressure high-velocity streams of electrolyte in a relatively narrow gap. Systems of this latter type have been found inconvenient from the point of view of the hardware necessary to carry out machining under such conditions and the sensitivity of the system to changes in the electrolyte pressure. Vibration has also been proposed as a possible solution to this problem. Furthermore, certain materials are not readily machinable because of their chemical composition by a continuous current system. For example, tungsten carbide requires polarity reversal periodically for optimum machining (see U.S. Pat. No. 3,357,912). In substantially all systems which have provided periodic reversal of the electrolytic machining current have applied out-of-phase AC or pulsating DC signals in superimposition upon the machining current so that the machining current waveform and the reversal waveform both may be considered generally sinusoidal or at best rounded with nonsteep leading and trailing flanks. Only the amplitude of the machining signals and the reverse signals can be adjusted in these devices.

It is the principal object of this invention to provide a system for the electrochemical machining of a conductive workpiece, especially composite (e.g. tungsten-carbide workpieces which are difficult to machine) which gives rise to an improved machining rate, better machining accuracy and decreased passivation at the gap.

Another object of the present invention is to provide a system of the character described which can be used without difficulty for different materials whose optimum machining parameters may differ.

These objects and others which will become apparent hereinafter, are attained in accordance with my present invention which provides a power supply for delivering a series of machining pulses to the electrode and workpiece with an intervening interruption of the signal, a reversal pulse being applied during such reversal and having essentially steep or square wave flanks which are adjustable with respect to the timing and correlation with the trailing edge of a prior machining pulse and the leading flank of the following machining pulse. It has surprisingly been found that when the reversal pulse has its leading flank substantially coincident with the trailing flank of the machining pulse, the machining process is most effective with iron bodies; however, when tungsten bodies are machined, best results are obtained when the trailing edge of the reversal pulse coincides with the leading edge of the subsequent machining pulse. The machining of copper and copper-zinc alloys by the electrochemical method of the present invention is best carried out with a reversal pulse substantially midway between the machining pulses.

Accordingly, I provide a power supply with solid-state switching devices and control both of the machining-pulse duration and interpulse interval duration and reversing switching means for generating a narrow pulse (pulse width less than the interval width) with adjustable timing so that the initiation of the reversal pulse can be simultaneous with termination of a machining pulse or may be delayed with respect to termination of a preceding machining pulse or may terminate concurrently with initiation of a subsequent machining pulse in dependence upon the material to be machined. I have found that a power supply for this purpose best comprises a number of parallel-connected solid-state switching devices (e.g. transistors) in series with a DC source and the machining system, two such circuits being provided with DC sources oppositely poled for generating the machining pulses and the reversal pulses respectively. According to a more specific feature of this invention, a multivibrator timing circuit is provided for alternately activating and deactivating the respective sets of switching transistors via amplifying transistors or the like, preferably tied to a timing constant network establishing the pulse duration. Between the output of the multivibrator and the parallel-connecting switching transistors assigned to the negative pulse train, I provide a controllable time-delay network whose time constant can be reduced to zero but which otherwise establishes a lag between cutoff of the machining pulse and initiation of the reversal.

As noted earlier, a further but related discovery in connection with depassivation of the electrochemical machining system is that steep-flank substantially square wave signals at the machining region provide a sharp increase in the accuracy of the machining operation as determined by reproducibility of the electrode or tool shape in the workpiece. As a practical matter, even though a square wave pulse is applied across the electrode and the workpiece, it is found that passivation films develop during the single machining pulse at a relatively high rate causing a decrease in the current during the passage of each machining pulse. The resulting current versus time plot of the waveform shows a sloping rounded shape as the passivation film develops, this shape being repeated in the machining pulses of the train as a consequence of reformation of the passivation film after each reversal pulse. I have found that the effects of such passivation films during the passage of the machining pulse can be reduced sharply by shaping the machining pulse to constitute it as a variable signal changing substantially at the rate of formation of the passivation film and adapted to maintain the current across the machining gap substantially constant.

When reference is made herein to electrochemical machining and the presence of a machining gap, it must be understood that these expressions include electrochemical grinding wherein, as described in my copending applications, Ser. No. 512,338 (now U.S. Pat. No. 3,475,312) and 562,857 (now U.S. Pat. No. 3,429,759), filed 8 Dec. 1965 and 5 July 1966, every effort is made to urge the electrode tool against the surface of the body to be machined. Various principles of the power supply system described above have also been applied in my copending applications, Ser. No. 511,827 (now U.S. Pat. No. 3,527,686) and 682,824, filed 6 Dec. 1965 and 14 Nov. 1967, respectively. The waveform-shaping network for the machining-voltage pulses and the reversal pulses (if necessary) may be inductive or capacitive impedances, L-C differentiating or integrating networks or simply R-C pulse shapers.

The above and other objects, features and advantages of the present invention will become more readily apparent from the following description, reference being made to the accompanying drawing in which.

Figures 1, 2A, 2B, 3:
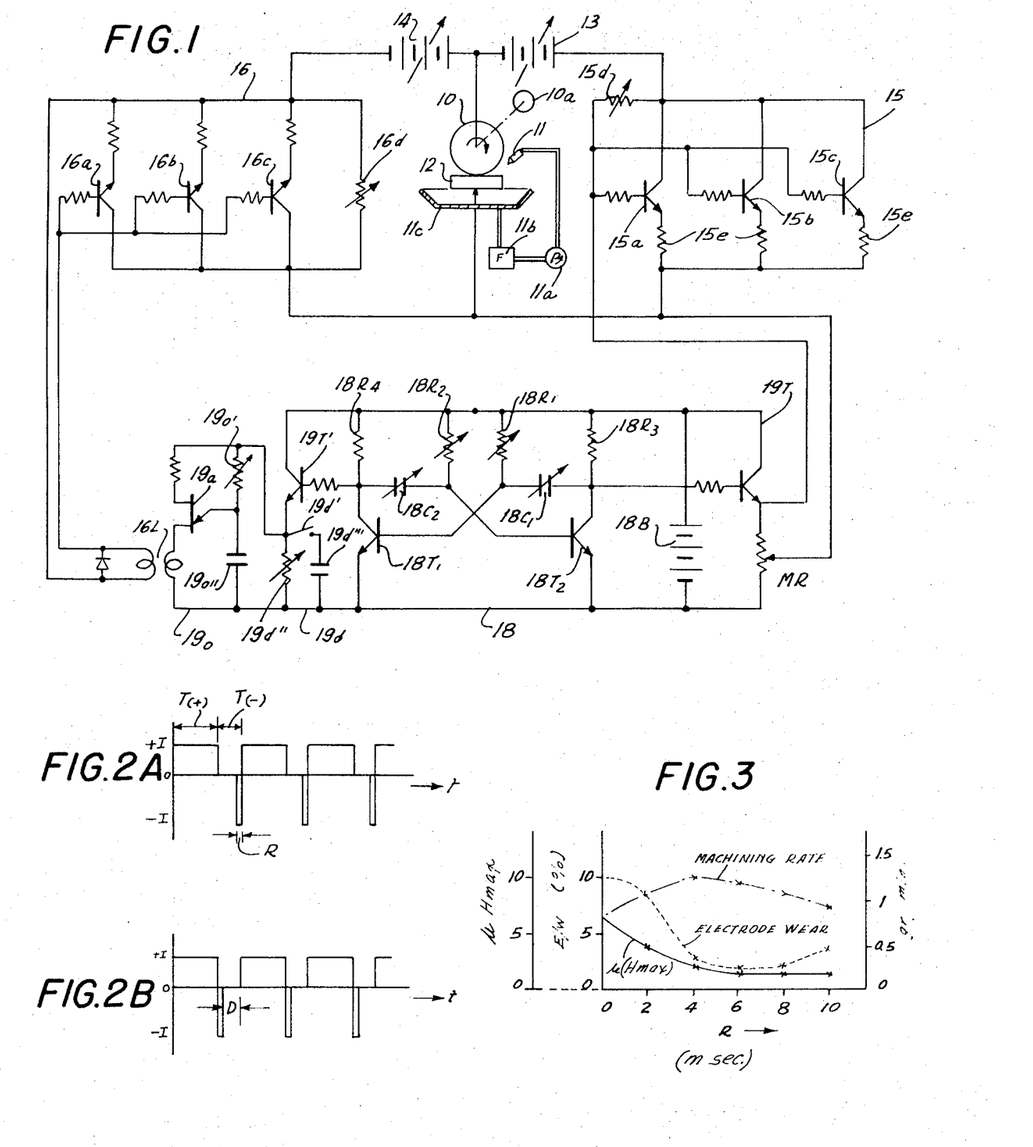
FIG. 1 is a circuit diagram of an apparatus embodying the present invention.
FIGS. 2A-2C are waveform diagrams showing the preferred current/time relationship for the machining and reversal pulses of the present invention.
FIG. 3 is a graph representing the results obtained with a specific example of the invention.

In FIG. 1, I show a circuit for operating an electrochemical grinding apparatus of the general type described in my copending application, Ser. No. 512,335, filed 8 Dec. 1965, and having a contoured wheel 10 composed of graphite or the like and driven by a motor 10a. The electrolyte is supplied to the interface between the electrode 10 and the metallic workpiece 12 by a nozzle 11 supplied with the electrolyte by a pump 11a from a filter 11b and a collecting vessel 11c. It will be understood, however, that the present invention applies equally to electrochemical cavities sinking and tap removal, to electrochemical machining using rodlike or elongated electrodes, etc.

In accordance with the present invention, the machining pulse is delivered across the machining gap by a first series circuit constituted by an adjustable DC source 13, and a bank of switching transistors 15. In this system, the switching transistors 15a, 15b and 15c have their emitter-collector branches connected in parallel with one another between the battery 13, one terminal of which is connected to the tool electrode 10, and the workpiece 12 so that, when transistors 15a and 15c are rendered conductive, they apply the positive pulse (FIGS. 2A-2C) serving for the principal machining operation. The bases of transistor 15a-15c are connected via the usual biasing resistor to the emitter terminal of a NPN transistor 19T whose function will be described in greater detail hereinafter. An adjustable bias resistor 15d establishes the base-collector bias while resistors 15e establish the emitter collector bias for the transistors 15a-15c.

The negative pulse is generated by a switching network 16 in series with an adjustable DC source 14 between the electrode 10 and the workpiece 12, the sources 13 and 14 being poled oppositely to one another. Here, the transistors 16a-16c have the emitter-collector terminals in parallel and bridged by a bias resistor 16d and are energized via biasing resistors at their base terminals from the output transformer 16L of a multivibrator power supply and timer. In accordance with this invention, a multivibrator network 18 is provided with a pair of transistors $18T_1$ and $18T_2$ cross-coupled via adjustable resistors $18R_1$, $18R_2$ and adjustable capacitors $18C_1$ and $18C_2$ in conventional flip-flop configuration, the switching device being energized by the battery 18B. Output or load resistors $18R_3$ and $18R_4$ are also provided.

The output signal of the multivibrator developed across $18R_3$ has a duration $T(+)=kR_1C_1$ which represents the duration of the positive pulse where $k$ is a constant and $R_1$ and $C_1$ represent the resistance and capacitance of the resistor $18R_1$ and $18C_1$, respectively. This signal energizes the output transistor 19T to apply a further signal across the voltage-dividing resistor 19R and thereby trigger the transistors 15c for the duration of the machining pulse, the RC network $18R_1$, $18C_1$ thereafter switching the multivibrator 18 to block transistor 19T.

The signal developed across resistor $18R_4$, whose duration is represented by the relationship $T(-)=k'R_2C_2$ (where $R_2$ and $C_2$ are the resistance and capacitance of members $18R_2$ and $18C_2$, respectively) triggers the output transistor 19T'. This transistor energizes a unijunction transistor timer 19o via a delay network 10d which may be cut out entirely by the switch 19d'. The delay network comprises an adjustable resistor 19d'' in parallel with a capacitor 19d'''. After an adjustable delay period determined by the time constant of this network, the unijunction oscillator 19o is energized to provide an output at the transformer 16L to trigger the switching circuit 16 for a period determined by the constancy of the relaxation network 19o', 19o'' which are, respectively, a variable resistor connected between the emitter and one base of the unijunction transformer 19u and a capacitor connected between the emitter and the other base of the unijunction transformer 19u and a capacitor connected between the emitter and the other base of the unijunction transistor.

Figure 2C:
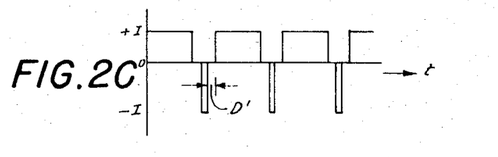

In FIGS. 2A-2C, I have illustrated several waveforms which have been found satisfactory for the machining of iron-tungsten carbide and copper or copper-zinc alloys, respectively. In each of these Figures, the amplitude of the current ($\pm$I) is plotted along the ordinate against time as the abscissa. The duration of the positive pulse is represented at $T(+)$ while the interval between the positive pulses is indicated at $T(-)$. At a delay period D or D' (FIGS. 2B and 2C) which may equal zero (FIG. 2A) determined by the network 19d, the reversal pulse is generated by the switching network 16 for a period R where, in accordance with an essential feature of this invention $R < T(-)$ and $R+D \leq T(-)$. Preferably D is about 20 msecs. The current of FIGS. 2A, 2B, 2C, 5B, 5C and 5D is in the form of steep-wavefront substantially instantaneously triggered and cutoff constant-level pulses of one polarity spaced by intervals and having during said intervals substantially instantaneously triggered and cutoff constant-level opposite-polarity pulses having a pulse with less than the duration of the respective interval.

EXAMPLE I

Figure 4A:
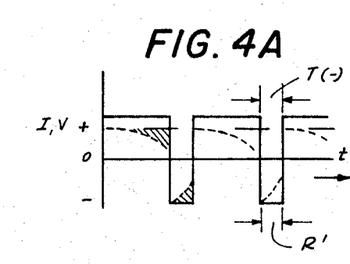
FIGS. 4A and 4B represent the relationship between voltage and current and the effects of passivation films.
Figure 4B:
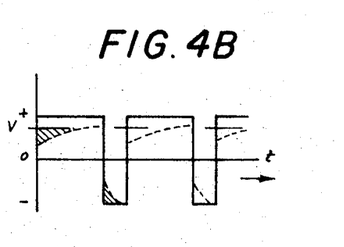
Figure 5A:
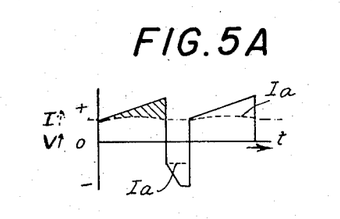
FIGS. 5A-5E show the improved waveforms of the present invention.
Figure 5B:
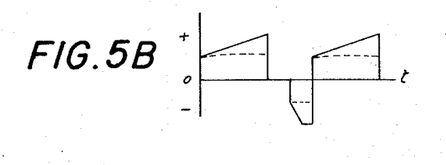
Figure 5C:
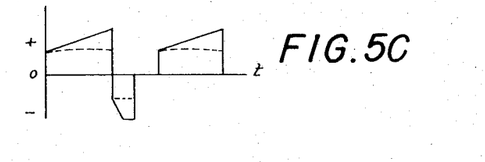
Figure 5D:
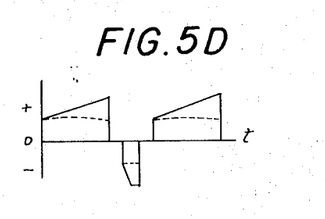

Using the apparatus in FIG. 1, a tungsten carbide workpiece containing 6 percent by weight cobalt was electrochemically ground in an aqueous potassium nitrate (5 percent by weight) electrolyte over a machining area of 1.6 cm² using the waveform represented in FIG. 2B and a delay period D of 20 msec. The results obtained are plotted in FIG. 3. The electrode was composed of graphite. In FIG. 3, the duration R of the negative pulse in msec. is plotted along the abscissa while three separate ordinate plots represent the ratio of electrode to workpiece wear in percents, the roughness of the machining surface in $\mu$(Hmax) and the machining rate in g./min. The machining rate is represented as a dot-dash line while the electrode wear is shown by broken lines and the surface roughness in solid lines. When R=0 (corresponding to no reversal of current and merely a 20 msec. interruption), the ratio of electrode wear to workpiece wear (E/W) is about 10 percent while the surface roughness is about 6 $\mu$(Hmax) and the machining rate is approximately 0.8 g./min. with a negative spike of a duration of 3 to 5 msec., the machining rate is raised to substantially 1.2 g./min. while the electrode wear is reduced to its minimum of about 2 percent (E/W) while the surface roughness is reduced to about 0.2-1 $\mu$(Hmax). Thereafter, the electrode wear increases, the machining rate falls while the surface roughness remains substantially constant. Surprisingly, as R approaches $T(-)$, analogous to the waveform used in my patent No. 3,357,912, the electrode wear rises sharply, the surface roughness remains constant or increases slightly depending upon the materials used and the machining rate falls off sharply as well. Furthermore, the sharper the wave fronts of the signal, the greater is the reproducibility of the machining process and the reproduction of the machining surface. Waveforms of the type shown in FIGS. 2A and 2C are most suitable for use with iron and steel workpieces and with copper and copper-zinc alloys, respectively. As noted earlier, I have found that even during the positive pulse, the passivation film may impede machining or distort same. Thus, in FIGS. 4A and 4B, I have plotted the voltage applied by a square wave generator with intervening reversal along the ordinate against time along the abscissa while the current is likewise represented in broken lines. The voltage is shown in solid lines. I have already pointed out that, preferably, the machining current waveform should be a square wave. However, the square wave is precluded by formation of the passivation film which, although the voltage maintains its square wave form, assumes a sawtoothlike configuration with machining current loss as represented by hatching in FIGS. 4A and 4B. In both cases, the broken lines represent the actual machining current while the dot-dash line represents the preferred current level for the machining operation. I have found that the effects of the passivation film, which appears to reform at each machining pulse (FIG. 4A) or forms substantially automatically and then is destroyed during the machining pulse (FIG. 4B), can be obviated by shaping the machining pulse so as to impart to the current waveform a compensation designed to regenerate the substantially square wave form mentioned earlier. Typical shaped waves, according to the present invention, are represented in FIGS. 5A–5E. In FIG. 5A, for example, I show a waveform which compensates for the passivation effect illustrated in FIG. 4A. In this system, a pulse shaping is effected to provide a gradual increase in the voltage with time substantially at the rate necessary to compensate for the current decrease with time shown in FIG. 4A. The resulting current waveform (dotted line $I_a$ in FIG. 5A) thus has the square wave configuration indicated to be desirable. The application of these principles to the waveforms shown in FIGS. 2A and 2B are subjected to passivation effects as represented in FIG. 4A so that here, too, I prefer to provide pulse shaping as described in connection with FIG. 5A. The results of such pulse-shaping are shown in FIGS. 5B and 5C. The application of the principle to the system of FIG. 2C is represented in FIG. 5D. The same pulse-shaping principle may be used to decrease the voltage of FIG. 5E so that the passivation film is destroyed rapidly and a square-type wave configuration is imparted to the current flow when the problem of FIG. 4B is encountered.

Figure 5E:
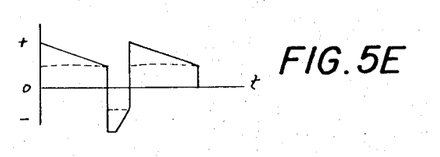
Figure 6:
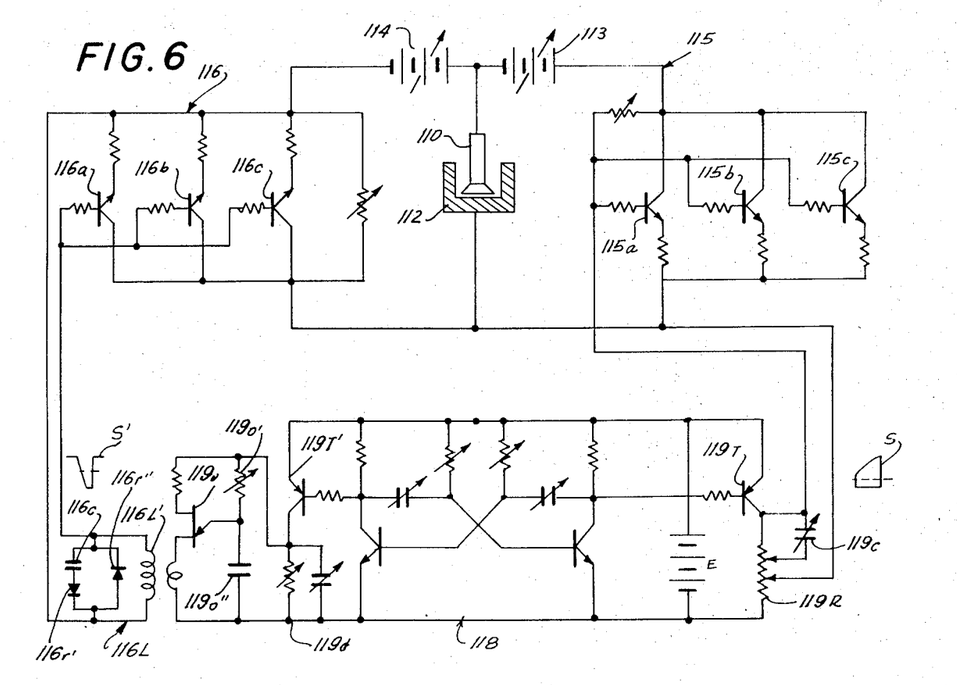
FIG. 6 is a circuit diagram of another arrangement in accordance with this invention.

In FIG. 6, I show a device generally similar to that previously described but allowing waveform shaping as indicated. In the system of FIG. 6, the tool electrode 110 is a cavity-sinking member cooperating with the workpiece 112 and supplied with electrolyte through the electrode via the means described in my U.S. Pat. No. 3,357,912. A machining pulse is applied across the workpiece/electrode gap from the DC source 113 connected in series with the emitter-collector branches of parallel-connected transistors 115a, 115b and 115c of solid-state switching assembly 115. The negative pulses are provided by a DC source 114 in series with the emitter-collector terminals of transistors 116a, 116b, 116c of another switching assembly 116. At the output side of the multivibrator trigger 118, which is constructed and operates as described in connection with FIG. 1, there is provided the PNP output transistor 119T' whose collector lies in series with the voltage dividing resistor 119R. To form the sawtooth voltage waveform represented at FIG. 5A, I provide a waveform-shaping impedance (e.g. variable capacitor 119C which is chargeable at a rate determined by the time constant of the network 119C, 119R) to provide a pulse shape as shown at S and trigger the switching transistors 115A, 115B, 115C accordingly. As a consequence, a substantially square wave machining pulse is applied across the machining assembly 110, 112. In place of a capacitive impedance AN INDUCTIVE impedance may be employed to provide the required pulse shape (FIG. 5E).

The other output of the multivibrator 118 is delivered to the base of the output transistor 119T' which is of the PNP type and is provided in its collector circuit with a delay network 119d whose function has been described earlier. The resistor 119o' and the capacitor 119o'' control the "on"-time of a unijunction transistor 119u which is transformer-coupled with the switching transistor assembly 116 as previously described. The output winding 116L' of the transformer 116L forms an inductance which, together with a pair of oppositely poled rectifiers 116r' and 116r'' and a capacitor 116c form an integrating circuit of spikelike output as represented at S'. The spike has a sufficient pulse height so that the passivation film is rendered ineffective and a square wave pulse is generated during the negative portion of the cycle as well (FIGS. 5A–5D).

Figure 7:
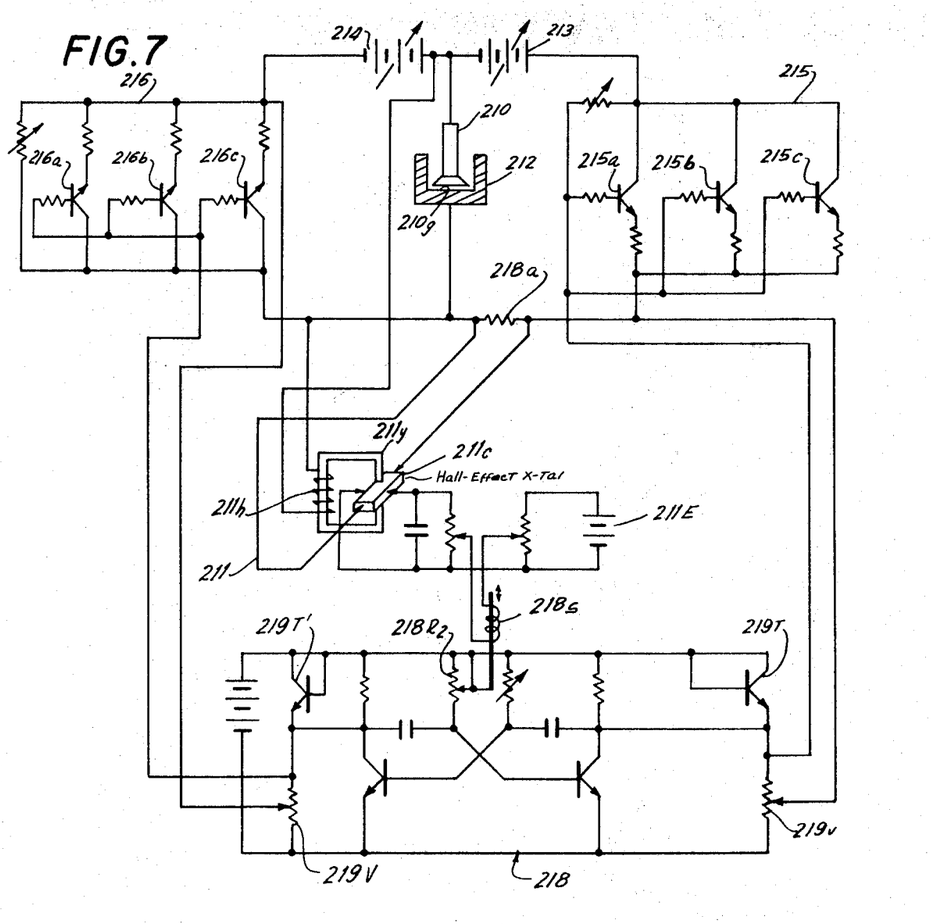
FIG. 7 is a diagram of a further system using improved feedback.

According to a further feature of this invention, the reversing pulse is delivered and the machining pulse is terminated when the machining power during each pulse falls to a predetermined level indicative of a film buildup to the point that power losses become substantial. Accordingly, I provide a feedback for the timing network which adjusts the interval between machining pulses, whether or not the reversing pulse width is coincident therewith, thereby triggering at least an interruption of the machining signal and generally also a reversal when the power delivered to the system during the machining pulse has in part been dissipated by predetermined buildup of the passivating film. In this embodiment, the multivibrator timer 218 has a variable resistor $218R_2$ forming part of a time-constant network for controlling the interval $T(-)$ between machining pulses.

As represented in this Figure, the wiper of the potentiometer is shiftable by a servomotor, here represented as a solenoid coil 218s. The power-detection system includes a resistor 218a in series with the workpiece, the machining gap 210g and the electrode 210 across the DC source 213 and the switching transistor assembly 215. The transistors 215a, 215b and 215c have their emitter-collector networks connected in parallel between the source 213 and resistor 218a. Also across the electrode 210 and the workpiece 212, there is provided a tap which serves as a feedback of the voltage to the coil 211h of a Hall-effect assembly 211.

A yoke 211y applies a magnetic field perpendicularly to the Hall effect crystal 211c so that the magnetic field is proportional to the amplitude of the voltage applied across the machining device. A second tap across the shunt resistor 218a passes an electric current through the crystal in a crystal plane perpendicular to the magnetic field while the output voltage is tapped perpendicularly to both the magnetic field and the proportional current and is applied across a temporary storage capacitor 211c to the voltage-dividing resistor 211r.

The reference voltage is supplied by a battery 211E and is compared with the voltage developed at resistor 211h by the coil 218a connected in a bridge circuit with the wipers of these variable resistors. The negative pulse generator comprising the variable source of direct current 214 is connected in series with the tool 210 and with the parallel-connected emitter-collector networks of the transformers 216a, 216b and 216c of the switching circuit 216. In this system, the output transistors 219T and 219T' control the voltage tapped from the voltage dividers 219v, 219V to regulate the duration of the positive pulse and the intervening pulse. Since the transistor switch 216 is energized directly (i.e. without a delay network or the unijunction transistor timing circuit), the negative pulse is coextensive with the interval between machining pulses (see FIG. 4A or 4B); however, the regenerative feedback from the Hall-effect crystal to the servomotor 218s adjusts the period $T(-)$ as well as the pulse width $R'$ as represented in FIG. 4A. When the film builds up more rapidly, the power variation (resulting from decreasing current while the applied voltage remains constant) will be detected rapidly and reversal initiated when the current amplitude falls off to the predetermined minimum level. The unijunction timing network for the negative pulse (FIG. 1), the capacitive or inductive pulse shaping networks (FIG. 6) and the LC integrating circuit 116L etc. (FIG. 6) are all compatible with the feedback system illustrated in FIG. 7 and it may be employed in conjunction therewith.

Figure 8:
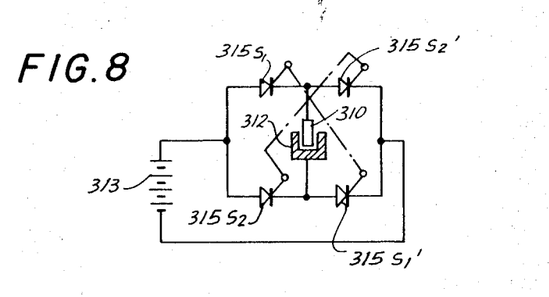
FIGS. 8, 9 and 10 represent other circuits for energizing the electrochemical machining system of the present invention.

FIGS. 8–11 represent other circuit arrangements for controlling the spacing between the terminal flank of the machining pulse and the forward flank of the reversal pulse, the gap width, etc. In FIG. 8, the system comprises a DC source 313 whose positive terminal is connected in series with a solid-state controlled rectifier 315S$_1$, the electrode 310 and workpiece 312, a correspondingly poled solid-state controlled rectifier 315S$_1$' and a negative terminal of the battery. A similar series circuit adapted to effect current flow in the opposite direction, is formed by the positive terminal of battery 313, the solid-state controlled rectifier 315S$_2$, the workpiece 312, the electrode 310, the solid-state controlled rectifier 315S$_2$' and the negative terminal of the battery.

Figure 9:
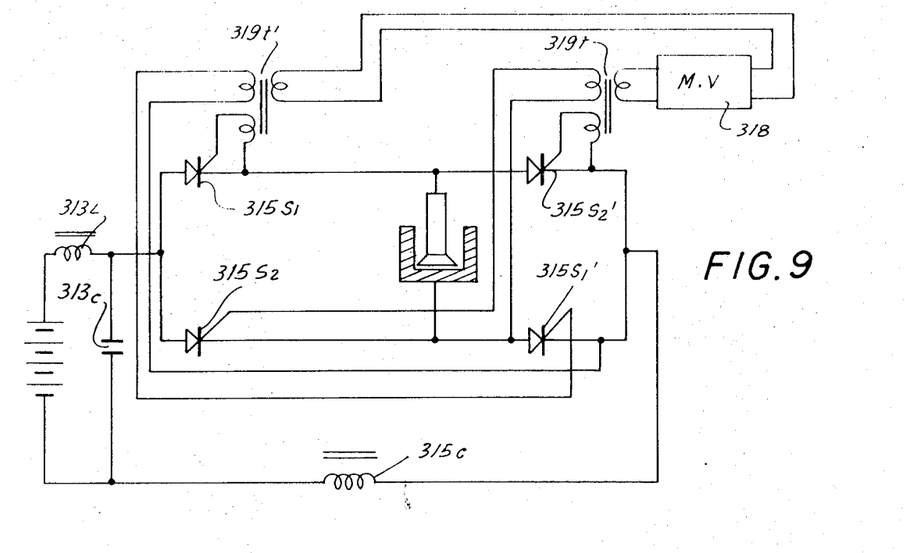
Figure 10:
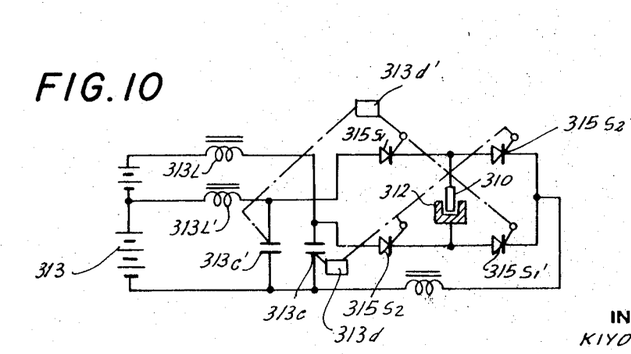
Figure 11:
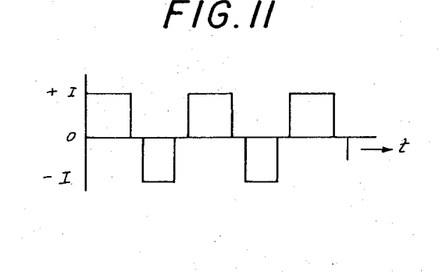
FIGS. 11 and 12 are waveform diagrams resulting from the circuits of FIGS. 8-20.
Figure 12:
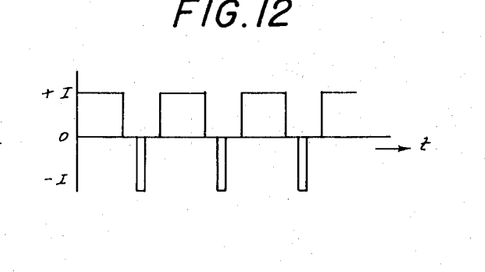

The gates of the series-connected rectifiers are tied for cross operation in alternation as represented by the dot-dash line (e.g. via a multivibrator); thus the sets 315S$_1$ and 315S$_1$' and 315S$_2$, 315S$_2$' are triggered alternately. When a gap is provided between a switchover of the conduction of the 2 sets, current waveforms such as those shown in FIGS. 11 and 12 are attainable. In FIG. 9, I show a system wherein the power supply includes a pulse shaping choke 315c between a storage capacitor 313c and its surge-suppressing choke 313L. The choke 315c facilitates quenching of the controlled rectifiers 315S$_1$, 315S$_1$', 315S$_2$ and 315S$_2$' after these controlled rectifiers have been triggered by the multivibrator 318. In this system, the multivibrator alternately operates a pair of transformers 319t and 319t' each having two secondary windings. The secondary windings are connected with the respective gates of the corresponding set of controlled rectifiers to ensure that both controlled rectifiers of each set will be simultaneously energized. IN the modification of FIG. 10, a pair of inductive-capacitive networks is provided at 313L, 313c and 313L', 313c', bridged across the DC source 313. A charge-level detector 313d and 313d' is provided to detect the level of charge at the capacitors 313c and 313c' and, upon the charge level attaining a predetermined value, triggering the controlled rectifiers 315S$_1$, 315S$_1$' and 315S$_2$, 315S$_2$' to discharge the respective current surge through the controlled rectifiers and across the machining gap. The capacity, charge and discharge times determine the values of T(+), T(−), R and D.

Figure 13:
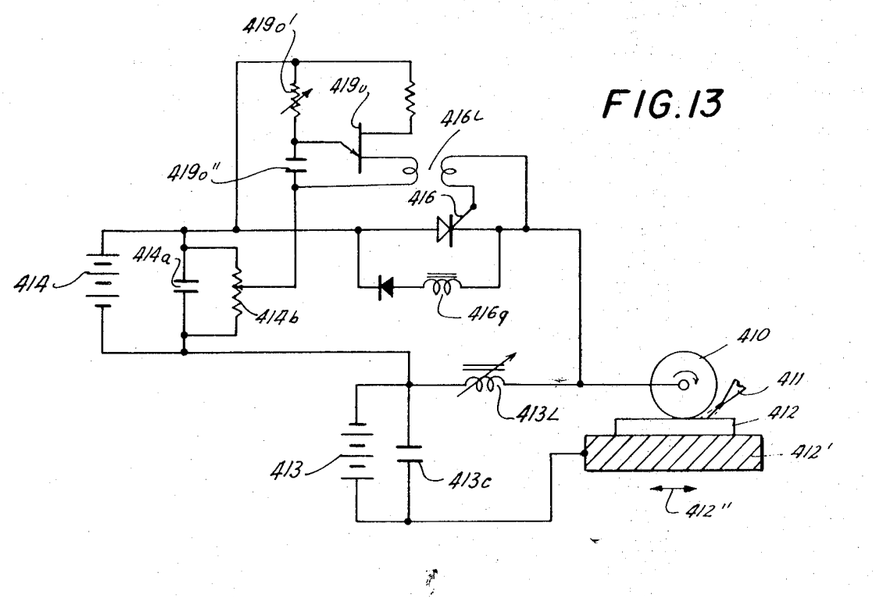
FIG. 13 is a circuit diagram of another power supply embodying the present invention.
Figure 14:
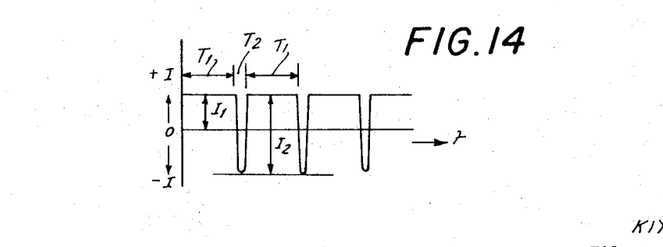
FIG. 14 is a wave diagram of the machining pulses produced with this system.

FIG. 13 shows an electrochemical machining circuit operated on principles analogous to those described in connection with FIG. 7 wherein, however, the interruption of the machining pulse and the coincidental application of the reversing parts results from superimposing a negative spike upon a continuous DC, the spike amplitude being in excess of the continuous-current amplitude. Thus, the apparatus comprises a graphite electrochemical grinding wheel 410 which machines a workpiece 412 with electrolyte being delivered to the interface at 411, the workpiece 412 being shifted upon a table 412' in the direction of arrow 412'' in a surface-grinding arrangement. A continuous DC source 413 is connected in series with a surge-suppressing choke 413L and is bridged by a DC blocking capacitor 413c while being connected across the electrode 410 and the workpiece 412. The source 413 delivers a machining current of an amplitude I$_1$ to the machining system (see FIG. 14). The pulse circuit includes a source 414, poled oppositely the source 413 and bridged by a DC blocking capacitor 414a and a voltage divider 414b tapped to energizing the relaxation network 419o' and 419o'' which, in turn, controls a unijunction transistor 419u whose output transformer 416L triggers a controlled rectifier 416. A rectifier and inductance network 416q, quenches the controlled rectifier to extinguish the reversing pulse. The unijunction transformer network controls the duration (T$_2$) of the negative pulse whose amplitude (I$_2$) exceeds I$_1$.

EXAMPLE II

Using the circuit of FIG. 13, a tungsten carbide workpiece containing 3 percent by weight cobalt is machined with a graphite wheel driven at a speed of 3,000 r.p.m. and having a diameter of 8 inches. The electrolyte is a 5 percent aqueous solution of potassium nitrate supplied at a rate of about 4.5 liter/min. The mean current delivered to the machining system was 60 a./cm.$^2$ and the amplitude I$_1$ was half the pulse amplitude I$_2$. The machining rate was measured at various ratios of machining current "on" time (T$_1$) to machining current "off" time (T$_2$). With a ratio T$_1$/T$_2$ of 1, machining was carried out at about 0.8 g./min. at a ratio T$_1$/T$_2$ switched between 2,3,4and 5, the machining rate rose from 1.2 to 1.7 and then reduced to 1.3 and 0.8 g./min., respectively. Optimum machining was carried out with a system in which the machining current "on+ time was three times the "off" or reversal pulse time. Best results were found with current density between 10 a./cm.$^2$ and 300 a./cm.$^2$.

The invention described and illustrated is believed to admit of many modifications within the ability of persons skilled in the art, all such modifications being considered within the spirit and scope of the appended claims.

I claim:

1. In a method of electrochemically machining a workpiece wherein a machining electrolyzing current is passed through a tool electrode juxtaposed with a workpiece and displaced relatively thereto in the presence of an electrolyte to erode electrochemically the workpiece with formation during such passage of machining current of a passivation film, the improvement which comprises the steps of applying said machining current in the form of steep wave front substantially instantaneously triggered and cutoff constant-level pulses of one polarity spaced by intervals, and applying during said intervals substantially instantaneously triggered and cutoff constant-level opposite-polarity pulses across the electrode and the workpiece of a pulse width less than the duration of the respective interval to electrochemically destroy said film.

2. The improvement defined in claim 1, further comprising the step of delaying each of the opposite-polarity pulses for a predetermined period subsequent to the termination of the preceding steep-wavefront pulse of said one polarity.

3. The improvement defined in claim 1 wherein said pulses are applied as voltage signals across said electrode and said workpiece, further comprising the step of shaping the voltage-signal envelopes to impart to the current during the passage at least of said steep-wavefront pulses of said one polarity of square wave configuration, thereby maintaining the intensity of said current substantially constant throughout each of said pulses of said one polarity in spite of the presence of said film.

4. The improvement defined in claim 1 wherein said pulses are applied by delivering a continuous electric current of said one polarity to said tool electrode and said workpiece at a first amplitude and superimposing upon said continuous electric current a plurality of opposite-polarity steep-flanked pulses of an amplitude exceeding said first amplitude.

5. The improvement defined in claim 4 wherein said opposite-polarity pulses are spaced apart at intervals in a ratio to the pulse width thereof of substantially 3:1 and said opposite-polarity pulses have an amplitude equal at least to twice the amplitude of said continuous electric current.

6. The improvement defined in claim 1, further comprising the step of automatically detecting the buildup of a passivation film between said tool electrode and said workpiece, and controlling the duration of said intervals in response to said detection and to at least one electrical parameter of said machining current as applied across said electrode and said workpiece to restrict the buildup of said film during each of said steep wave front pulses.

7. The improvement defined in claim 1, further comprising the step of selectively setting the pulse width of said steep wave front pulses of said one polarity in dependence upon the material constituting said workpiece.

8. The improvement defined in claim 1, further comprising the step of selectively setting the duration of said intervals in dependence upon the material constituting said workpiece.

9. The improvement defined in claim 1, further comprising the step of selectively setting the pulse width of said opposite-polarity pulses in dependence upon the material constituting said workpiece.

10. The improvement defined in claim 1, further comprising the step of selectively setting the delay between the termination of one of said steep wave front pulses of said one polarity and the commencement of the subsequent opposite-polarity pulses in dependence upon the material constituting said workpiece.

11. The improvement defined in claim 1, further comprising the step of selectively setting a delay between the termination of one of said opposite-polarity pulses and the commencement of the subsequent steep wave front pulse of said one polarity in dependence upon the material constituting said workpiece.

12. The improvement defined in claim 1, further comprising the step of selectively setting the relative amplitudes of said steep wave front pulses of said one-polarity and said opposite-polarity pulses in dependence upon the material constituting said workpiece.

* * * * *